United States Patent [19]

Chang

[11] Patent Number: 5,218,338

[45] Date of Patent: Jun. 8, 1993

[54] CODED ANTI-THEFT SYSTEM

[76] Inventor: Tsu-yung Chang, No. 15, Lane 351, Sec. 2, Chungshan Rd., Yuanlin Town, Changhua Hsien, Taiwan

[21] Appl. No.: 832,985

[22] Filed: Feb. 10, 1992

[51] Int. Cl.⁵ .......................................... B60R 25/10
[52] U.S. Cl. ................................. 340/426; 340/543; 340/528; 307/10.4; 307/10.6; 361/172
[58] Field of Search ............... 340/426, 527, 528, 543; 307/10.2, 10.4, 10.3, 10.6; 361/171, 172

[56] References Cited

U.S. PATENT DOCUMENTS

| | | | |
|---|---|---|---|
| 2,855,588 | 10/1958 | Allen | 340/527 |
| 3,544,804 | 12/1968 | Gaumer et al. | 307/10.4 |
| 3,637,037 | 1/1972 | Doland et al. | 340/426 |
| 3,649,962 | 3/1972 | Bedard et al. | 340/528 |
| 3,755,777 | 8/1973 | Lee | 307/10.4 |
| 4,232,758 | 11/1980 | Crosas | 307/10.4 |
| 4,291,296 | 9/1981 | Seifers | 307/10.3 |
| 5,043,720 | 8/1991 | Laurienzo | 340/528 |
| 5,061,915 | 10/1991 | Murphy | 307/10.2 |

FOREIGN PATENT DOCUMENTS

2347729  9/1976  France ........................... 340/527

Primary Examiner—Jin F. Ng
Assistant Examiner—Nina Tong
Attorney, Agent, or Firm—Dellett, Smith-Hill and Bedell

[57] ABSTRACT

A coded anti-theft system of the present invention employs a keyswitch board, a number of relays and timers, and a number of peripherals including a first sensing device, a second sensing device, a starting device, an indicating device, and an alarming device. Aggressive activity is sensed by the sensing devices to sound the alarming device. The system is set with a code by a user, and only the user who enters the correct code can enable the starting device to start the vehicle.

11 Claims, 6 Drawing Sheets

CODED ANTI-THEFT SYSTEM

BACKGROUND OF THE INVENTION

The present invention relates to a coded anti-theft system, particularly to a coded anti-theft system composed of relays and timers.

The coded anti-theft system commercialized at the present time usually utilizes an electrical integrated circuit which has the following drawbacks.

(1) The conventional anti-theft system dissipates power after being actuated, that is, the control circuit being actuated will further use power to maintain a conductive status, thereby sustaining an alert mode. Since staying in the alert mode requires the dissipation of a relatively high amount of power, the conventional anti-theft system is apt to cause an insufficient amount of power which disables the function of the coded anti-theft system.

(2) The conventional anti-theft system requires a memory device to store the code, which requires power to maintain. Therefore, when the power is insufficient, the memory device will lose the code and the user has to set a new code.

(3) The function of integrated circuit in the conventional anti-theft system is easily affected by the peripheral temperature, especially when the frequency of the integrated circuit drifts when the anti-theft system is used in a relatively high-temperature environment. Although the anti-theft system is installed with a temperature compensation circuit, the installation cost is higher and requires more maintanance.

(4) The electrical anti-theft system is easily interrupted by peripheral electronic waves, causing errors in the function thereof. A remote control anti-theft system used at the present time has merely a narrow band of frequency, and a number of signals have to be transmitted in the limited amount of channels. This easily causes interruption between two signals which are in the same channel. In addition, more and more decoding devices have been commercialized, which are able to decode the code of the remote control anti-theft system.

(5) Most anti-theft systems are easily interrupted by shaking and noise, because they are motion-activated or sound-sensing types of remote control anti-theft systems. These types of anti-systems are apt to experience errors in function due to environmental elements. Although the sensing device implemented in this anti-system is adjustable, if the sensitivity of the sensing device is adjusted too high, the anti-system may have erroneous response even by some non-aggressive stimulus, such as a car moving nearby, and if the sensitivity is adjusted too low, the anti-theft system may not detect aggressive activity.

The inventor of the present invention has created a coded anti-theft system which utilizes a combination of relays and timers to prevent the above drawbacks of conventional coded anti-theft systems.

SUMMARY OF THE INVENTION

The coded anti-theft system of the present invention provides a system for detecting aggressive activity and sounding an alarm. It generally comprises a plurality of keyswitches, a plurality of relays and timers, a plurality of sensing means, an alarming means, and a plurality of coupling lines connected therebetween, where a number of the coupling lines are jumping lines, thereby setting different codes by a user.

The modes of operation of coded anti-theft system of the present invention are separated into an alert mode, a door-opened mode, a key-locked mode, and a disabled mode.

In the alert mode the system is in a sensitive condition to sense any aggressive activities, thereby causing the alarming means to sound when aggressive activity happens.

The door-opened mode is defined as the mode of operation during the period when the door is opened, causing an alarming means to sound for a predetermined period of time.

The key-locked mode is defined as the mode of operation when any person enters the vehicle and keys in a wrong code, causing the whole keyswitch board to be locked unless he knows a specific keyswitch to release this key-locked condition.

The disabled mode is defined as when a user keys in a correct code from the keyswitch board, releasing the anti-theft system and enabling the vehicle to start.

It is an object of the present invention to provide an anti-theft system which consumes few power when in an alert mode.

It is another object of the present invention to provide a coded anti-theft system, which does not need any power to maintain a code therein.

It is another object of the present invention to provide a coded anti-theft system, which allows a user to change the code by exchanging corresponding jumping lines.

It is another object of the present invention to provide a coded anti-theft system which utilizes a mechanical structure to replace the conventional anti-theft system, thereby preventing the frequency drift or signal interruption problem of electronic ones.

It is another object of the present invention to provide a coded anti-theft system which can still provide alarming even when the power line or other control lines are cut off.

It is another object of the present invention to provide a coded anti-theft system which has a relatively low cost, is reliable, does not affect the function of the computer equipments already installed on the vehicle, and is easily maintained.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

A coded anti-theft system in accordance with the present invention generally comprises a keyswitch board, a plurality of relays and timers, and a number of peripheral means including a first sensing means, a second sensing means, a starting means, an indicating means, and an alarming means. A plurality of coupling lines are connected between the various elements. The anti-theft system is intended for use on an automobile for detecting aggressive activity thereto and, upon detection, sounding an alarm.

The anti-theft system normally stays in an alert mode for sensing aggressive activities and, upon detection, sounding an alarm. If the owner of the car opens the door and keys in a correct code within a predetermined period of time, the anti-theft system is released to a disabled mode, thereafter actuating the starting means to start the engine.

Figure 1:
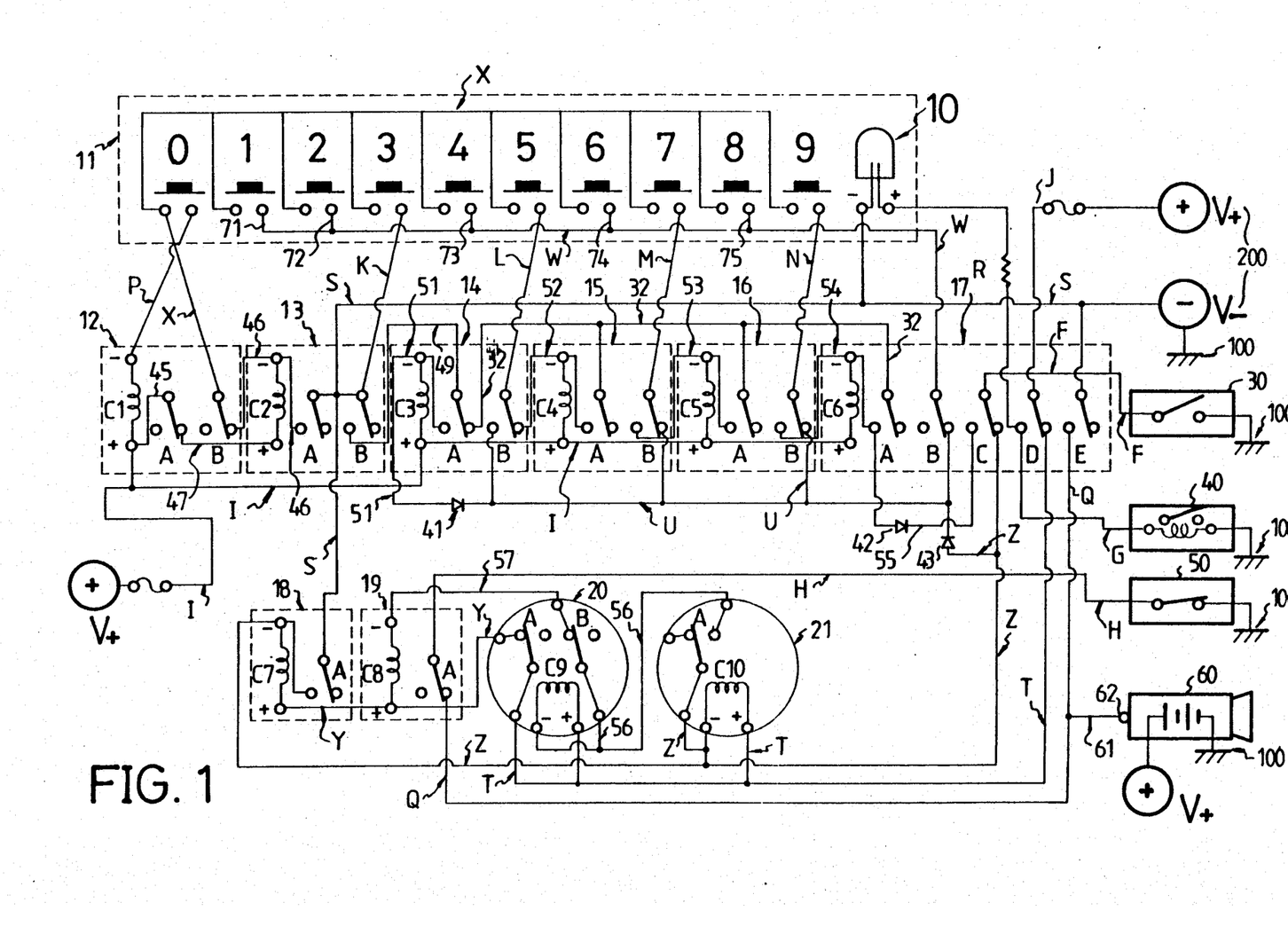
FIG. 1 is a circuit diagram of a coded anti-theft system in accordance with the present invention, showing the system in an alert mode and a code set as "03579"

Each timer used in the present invention is a relay-type timer and is drafted in a simplified form like a relay, as shown in FIG. 1, labeled with 20 and 21. Each relay and timer used in the present invention has one coil and at least one switch which contains a fixed relay contact, a normally-closed relay contact, and a normally-open relay contact. In a normal condition, each relay or timer is not energized, and the fixed relay contact is coupled to the normally-closed contact, not to the normally-open contact. If a relay or timer of the present invention has only one switch, then the switch is designated as an A-set switch. If a relay or timer has more than two sets of switches, then the switches are designated as an A-set switch, a B-set switch, a C-set switch, and so on. However, each relay or timer has a specific name so that the switches for different relays will not be confused.

For convention herein, if a relay is energized, i.e., the relay is in energized status, the positive terminal of the relay coil is provided with a positive voltage (12 volts for vehicle), and the negative terminal of the relay coil is grounded, thereby causing the fixed relay contact to separate from the normally-closed contact and couple to the normally-open contact. If the relay is de-energized, the fixed relay contact switches back to the normally-closed contact. If a timer is energized, after a predetermined time period passes, the fixed relay contact of the timer switches from the normally-closed contact to the normally-open contact (and then switches back to the normally-closed contact if de-energized). For the sake of shortening the representation in the following description, the negative terminal of the coil of a relay is represented as the negative terminal of the relay, the same being true for the positive terminal.

Figure 1A:
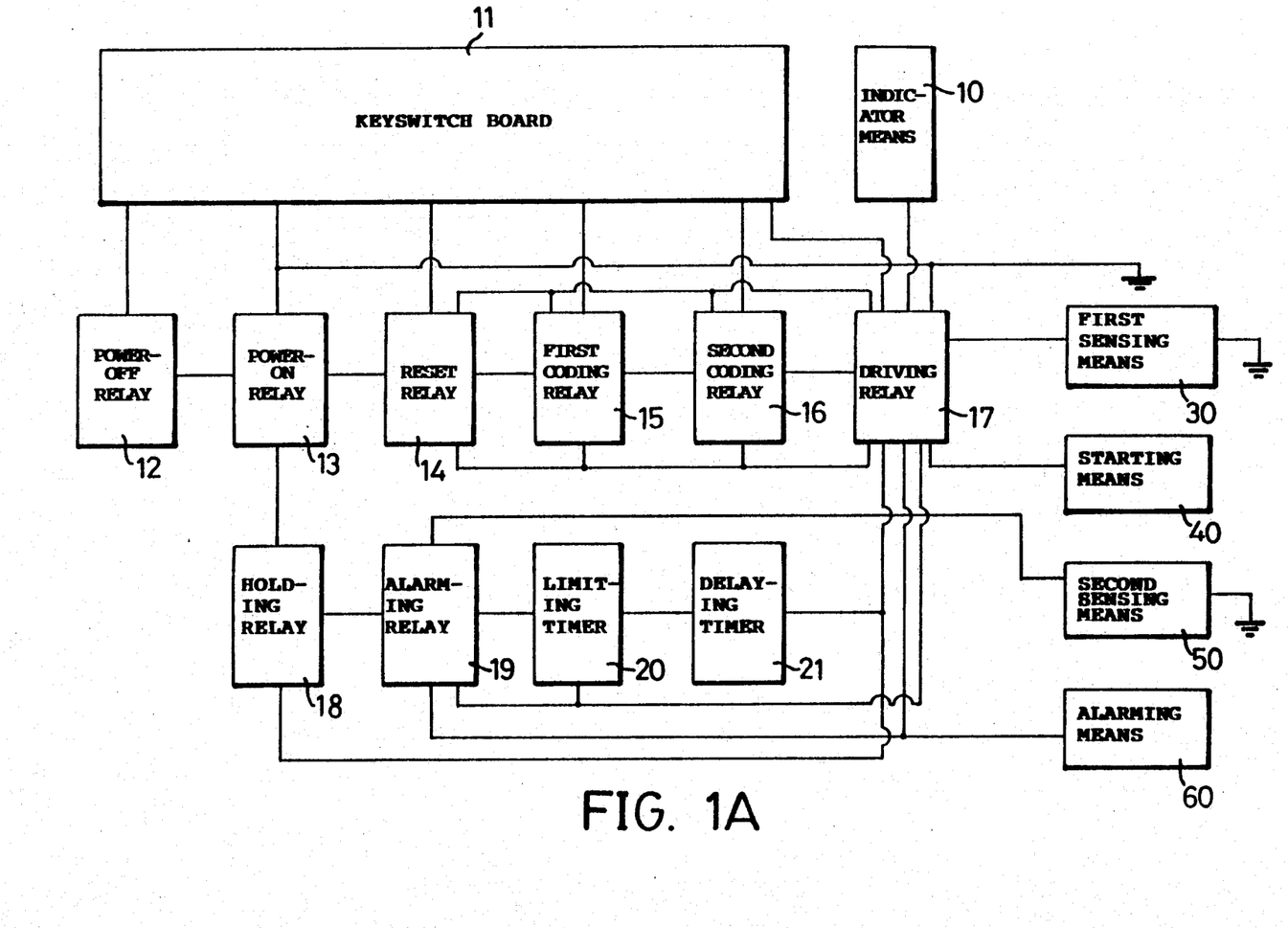
FIG. 1A is a block diagram of a coded anti-theft system in accordance with the present invention.

Referring to FIGS. 1 and 1A, a schematic and a block diagram of the anti-theft system are illustrated. As can be seen, the relays and the timers are all in a normal condition, that is, each relay or timer is not energized, and the fixed relay contact is coupled to the normally-closed contact.

The system is provided with a power supply 200 having a positive terminal V+ and a negative terminal V− to supply a direct-current power, the negative terminal V− thereof being connected to ground 100.

A keyswitch board 11 has a plurality of presumptive normally-open keyswitches 0, 1, 2, 3, 4, 5, 6, 7, 8, and 9, each of which has a first contact on the left side thereof, a second contact on the right side thereof, and a conductive bar. The conductive bar is normally separated from the first and second contacts, but conductively bridges the first and second contacts when a keyswitch is pressed. In the actual physical structure (not shown) of the keyswitch board 11, each keyswitch 0-9 is installed with a corresponding pad which is labeled with a like number with the corresponding keyswitch. For example, keyswitch 3 has a corresponding pad designated by "3" on a user-accessible keypad. The physical structure (a keypad) of the keyswitch board 11 is similar to a common keyboard of a telephone or the like.

With continued reference to FIG. 1, the anti-theft system in accordance with the present invention comprises an alarming means 60 which employs a chargeable battery therein which is normally charged by the power supply 200 and is further grounded at a control terminal 62 is removed from ground, the alarming means 60 will sound;

The anti-theft system further comprises a first sensing means 30 which is a normally-open door switch. The door switch is installed in a door of the vehicle for sensing whether the door is open or closed. When the door is closed, the door switch is open (off), and when the door is open the door switch is closed (on) which triggers the alarming means 60 to sound.

A second sensing means 50 is further provided. The second sensing means 50 is a normally-closed switch which horizontally installed on the engine hood of the vehicle for sensing whether the hood is open or closed. When the hood opened more than 30 degrees, the normally-closed switch opens (off) and triggering the alarming means 60 to sound;

The anti-theft system also comprises an indicator means 10 for indicating the status of the entire system, such that when the indicator means 10 is off, the system is in an alert mode or a key-locked mode, and when the indicator means 10 is on, the system is in a disabled mode.

The anti-theft system still further comprises starting means 40 for enabling the vehicle to start when the system is in a disable mode.

The plurality of relays and timers and employed in the anti-theft system. The relays and timers include a power-off relay 12 for cutting off a required loop of decoding; a power-on relay 13 for forming a required path of decoding; a reset relay 14 for locking and releasing; two coding relays 15, 16 for decoding; a holding relay 18 for holding a temporarily grounded path due to a door-opening and error decoding; an alarming relay 19 for controlling the alarming means 60 to sound; a limiting timer 20 for determining a time period of alarming; a delaying timer 21 for determining a time period from the opening of a door until the alarming means 60 sounds; and a driving relay 17 for controlling the peripheral means, that is, the sensing means 30 and 50, the starting means 40, the indicator means 10, and the alarming means 60, as well as the holding relay 18, the alarming relay 19, the limiting timer 20, and the delaying timer 21.

The relays 12 to 19 respectively comprise first to eighth coils C1 to C8. The relays 12 to 16 each further comprise an A-set switch and a B-set switch. The driving relay 17 further comprises an A-set switch, a B-set switch, a C-set switch, a D-set switch, and an E-set switch. The relays 18 and 19 each further comprise an A-set switch.

The ground 100 is coupled to the negative terminal of the power supply 200, the normally-closed contact of the E-set switch of the driving relay 17, a negative terminal of the indicator means 10, and the fixed contact of the holding relay 18 via line S.

The negative terminal of the power-on relay 13 is connected to the normally-open contact of the A-set switch thereof and to the normally-closed contact of the B-set switch of the power-off relay 12 via line 46.

The normally-open contact of the B-set switch of the power-on relay 13 is connected to the fixed contact of the A-set switch of resetting relay 14 via line 49.

Line 32 is used to connect the normally-closed contact of the A-set switch of the resetting relay 14, the fixed contact of the A-set switch of the first coding relay 15, the fixed contact of the A-set switch of the second coding relay 16, and the fixed contact of the driving relay 17.

The negative terminal of resetting relay 14 is connected to the normally-open contact of the A-set switch thereof and to an anode of a first diode 41 via line 51.

Line U couples a cathode of the first diode 41, the normally-open relay contact of the B-set switch of the resetting relay 14, the normally-closed contacts of the B-set switches of the coding relays 15, 16, the normally-closed relay contact of the B-set switch of the driving relay 17, and a cathode of a third diode 43.

The negative terminal of the first coding relay 15 is connected to the normally-open contact of the A-set switch thereof and the normally-closed contact of the B-set switch of the resetting relay 14 via line 52.

The negative terminal of the second coding relay 16 is coupled to the normally-open relay contact of the A-set switch thereof and to the normally-open relay contact of the B-set switch of first coding relay 15 via line 53.

The negative terminal of the driving relay 17 is coupled to the normally-open relay contact of the A-set switch thereof and to the normally-open relay contact of the B-set switch of the second coding relay 16, and is further coupled to an anode of a second diode 42 via line 54. The cathode of the second diode 42 is coupled to the normally-open relay contact of the C-set switch of the driving relay 17 via line 55.

The positive terminal V+ of the power supply 200 is connected to the positive terminals of the power-off relay 12, the reset relay 14, the coding relays 15, 16, and the driving relay 17, respectively, via line I. The positive terminal of the power-off relay 12 is connected to the fixed contact of the A-set switch thereof via line 45. Additionally, the positive terminal V+ of the power supply 200 is also connected to the fixed relay contact of the D-set switch of the driving relay 17 via line J.

The positive terminal of the power-off relay 12 is connected to the fixed relay contact of the A-set switch thereof via line 45.

The positive terminal of the power-on relay 13 is connected to normally-closed contact of the A-set switch of the power-off relay 12 via line 47.

The normally-closed contact of the D-set switch of the driving relay 17 is connected to the positive terminals of the delaying timer 21 and the limiting timer 20 and to the fixed relay contact of the A-set switch of the limiting timer 20 via line T. The normally-closed contact of the A-set switch of the limiting timer 20 is connected to the positive terminals of the holding relay 18 and the alarming relay 19 via line Y.

The door switch 30 has one end connected to ground 100 and the other end connected to the fixed contact of the C-set switch of driving relay 17 via line F. Line Z is coupled among the normally-closed relay contact of the C-set switch of the driving relay 17, the anode of the third diode 43, the negative terminal of the delaying timer 21, the fixed relay contact of the A-set switch of the delaying timer 21, the negative terminal of the holding relay 18, and the normally-open contact of the A-set switch thereof.

The normally-open contact of the A-set switch of the delaying timer 21 is coupled to the fixed contact of the B-set switch of the alarming timer 20 and the negative terminal thereof via line 56.

The normally-closed relay contact of the B-set switch of the alarming relay 20 is connected to the negative terminal of the alarming relay 19 via line 57.

The starting means 40 has one end connected to ground 100 and the other end connected to the normally-open relay contact of the D-set switch of the driving relay 17 via line G. Only when the driving relay 17 is energized does the D-set switch thereof couple lines J and G together and to provide a working loop for the starting means 40. The starting means 40 is then enabled to start the motor of the vehicle.

The indicator means 10 has a positive end coupled to the normally-open relay contact of D-set switch of the driving relay 17 via a resistor R, and has a negative end coupled to ground 100 via line S. The indicator means 10 is preferably a light-emitting diode (LED).

The second sensing means 50 has one end connected to ground 100 and another end connected to the fixed relay contact of the alarming relay 19 via line H. The normally-closed relay contact of the A-set switch of the alarming relay 19 is connected to a control terminal 62 of the alarming means 60 via line Q and line 61.

The chargeable battery of the alarming means 60 is connected between the positive voltage V+ and ground 100, respectively, at positive and negative terminals thereof. A control terminal 62 of the alarming means 60 is coupled to the normally-open contact of the E-set switch of the driving relay 17 via lines 61 and Q.

The alarming means 60, the A-set switch of the alarming relay 19, and the second sensing means 50 are coupled together via lines 61, Q, and H to constitute a normally-closed alarming loop.

Figure 3:
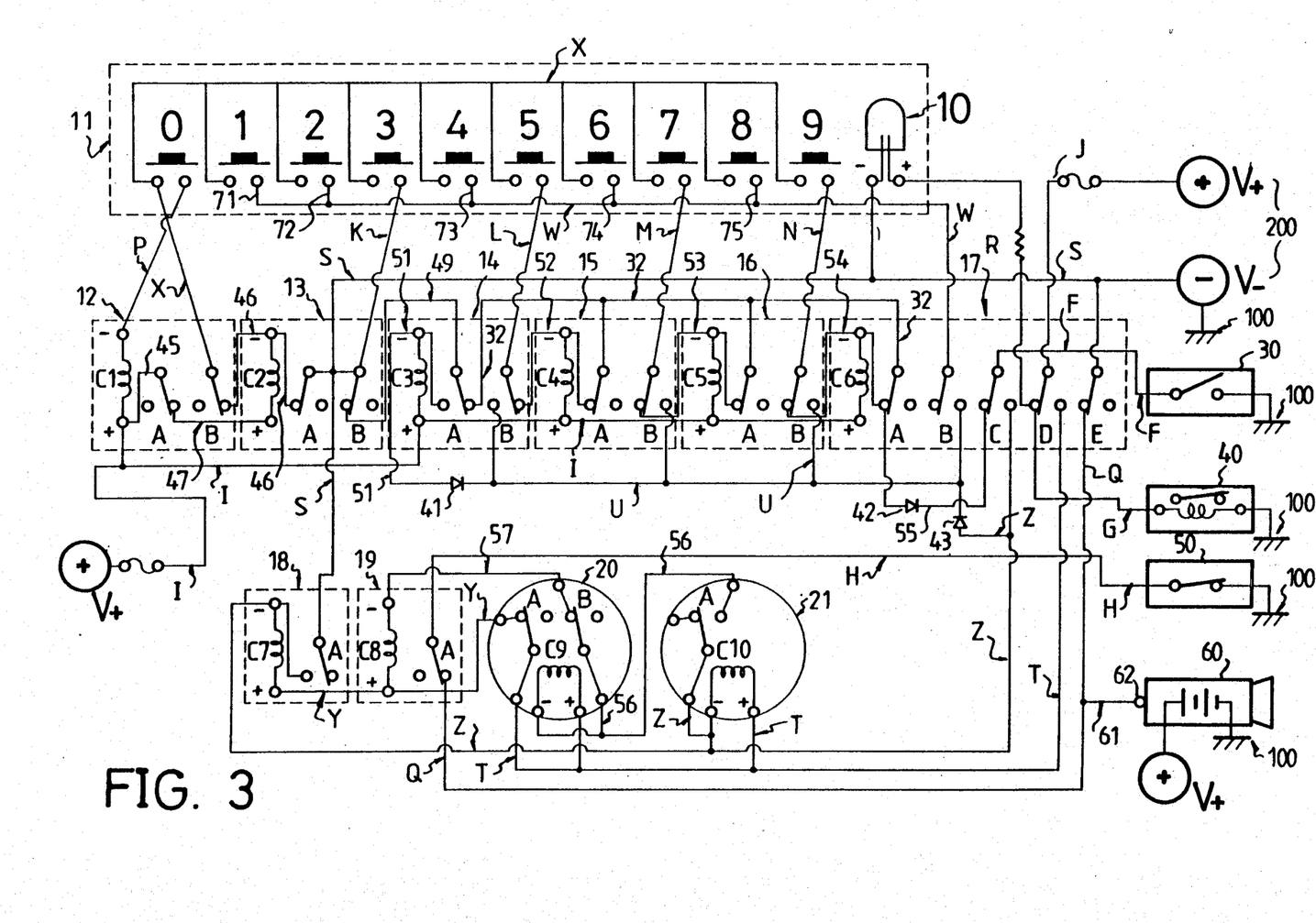
FIG. 3 is a view similar to FIG. 1, showing the system in a disabled mode.

The alarming means 60, the E-set switch of the driving relay 17, and ground 100 are coupled together via lines 61, Q, and H to constitute a closed loop in disabled mode, as shown in FIG. 3, which prevents the alarming means 60 to sound when opening the engine hood and disconnecting the second sensing means 50.

All the keyswitches 0 to 9 have first contacts thereof coupled together through line X to the fixed relay contact of the B-set switch of the power-off relay 12. Keyswitch 0 has a second contact thereof connected to the negative terminal of the power-off relay 12 via line P. Keyswitch 3 has a second contact thereof connected to the fixed contact of the B-set switch of the power-on relay 13 via line K. Keyswitch 5 has a second contact thereof connected to the fixed contact of the B-set switch of the resetting relay 14 via line L. Keyswitch 7 has a second contact thereof connected to the fixed contact of B-set switch of the coding relay 15 via line M. Keyswitch 9 has a second contact thereof connected to the fixed contact of the B-set switch of the coding relay 16 via line N;

As described above, keyswitches 0, 3, 5, 7, and 9 have the second contacts thereof connected to relays 12, 13, 14, 15, and 16, respectively, thereby determining the code of the anti-theft system, for example, the code for this embodiment is "03579."

The other keyswitches 1, 2, 4, 6, and 8 have the second contacts thereof connected to line W via lines 71, 72, 73, 74, and 75, respectively. Line W is further connected to the fixed relay contact of the B-set switch of the driving relay 17.

Lines P, K, L, M, N, 71, 72, 73, 74, and 75 are jumping wires which are able to switch with each other at the second contacts of corresponding keyswitches, thereby changing the code of the anti-theft system.

The first diode 41 is used to limit ground coupling in a single direction, that is, to prevent the grounding of line Z via line S, the B-set switch of the power-on relay 13, line 49, the A-set switch of the resetting relay 14, line 51, line U, and the third diode 43, and is further used to lock the delaying timer 21 and the limiting timer 20 in energized statuses when the resetting relay 14 is energized.

The second diode 42 is used to limit ground coupling in a single direction, that is, to prevent the grounding of line F from line 32 via the A-set switch and the B-set switch of the driving relay 17, when the driving relay is energized. This is because line F is further connected to a buzzing device (not shown), which is a conventional arrangement on a vehicle, such that when line F is grounded, the buzzing device sounds to indicate that the door is not closed.

The third diode 43 is used to limit ground coupling in a single direction, that is, to prevent the grounding of the negative terminal of the resetting relay 14 via line F, the C-set switch of the driving relay 17, line Z, line U, the first diode 41, and line 51, and is further used to trigger the resetting relay 14 to be energized when the door of vehicle is opened.

OPERATION

Referring to FIG. 1, when the anti-theft system is in the alert mode, the LED 10, relays 12 to 19, and timers 20, 21 are all off (de-energized).

If anyone (including a thief) opens the door, either properly or improperly, the first sensing means 30 is pressed on and grounded. The ground 100 is transparent to the negative terminals of the holding relay 18 and the delaying timer 21 and the fixed contact of the delaying timer 21 via the first sensing means 30, line F, the C-set switch of the driving relay 17, and line Z. When the negative terminal of holding relay 18 is connected to ground 100, the holding relay 18 is energized and the A-set switch thereof is switched to the normally-open contact and coupled to ground 100 through line S, thereby maintaining the holding relay 18 to be energized and further maintaining line Z to be grounded, such that the delaying relay 21 continues to count a first predetermined period of time (e.g., 30 seconds).

If a thief or the owner does not key in the correct decoding code (in FIG. 1, "3579") to release the alert mode of the anti-theft system, then after the delaying timer 21 finishes counting the first predetermined period of time (30 seconds), the A-set switch of the delaying timer 21 switches from the normally-closed contact to the normally-open contact. This causes the ground 100 to be transparent to the negative terminal and the fixed relay contact of the B-set switch of the limiting relay 20 via line Z, the normally-open contact of the delaying relay 21, and line 56. This also actuates the limiting relay 20 to count for a second predetermined period of time, e.g. 10 seconds. In the meantime, since the ground 100 is also transparent to the negative terminal of alarming relay 19 via the B-set switch of the limiting timer 20 and line 57, the alarming relay 19 is energized and the A-set switch thereof is switched from the normally-closed contact to the normally-open contact, disconnecting line Q from ground 100 and causing the alarming means 60 to sound. When the limiting timer 20 finishes counting, the power to the alarming relay 19 and the holding relay 18 is cut off by the switching of the A-set switch and the B-set switch of the limiting timer 20 from the normally-closed contact to the normally-open contact, and causes the A-set switches of holding relay 18 and alarming relay 19 to switch back to their normally-closed contacts, respectively. The alarming means 60 stops sounding when the A-set switch of alarming relay 19 switches back to the normally-closed contact causing wire Q to be transparent to ground 100 through the alarming relay 19, line H, and the second sensing means 50. Therefore, the anti-theft system provides a function which can stop the alarm in a second predetermined period of time (10 seconds). This effect deters the thief but does not interfering the surrounding people too long.

In the mean time, during the second predetermined period of time, supposing the door is closed (i.e., the door switch 30 is in the normally-open status) the holding relay 18 is de-energized, causing the A-set switch thereof to switch back to the normally-closed contact which disconnects line Z from ground 100 and de-energizes the timers 20 and 21. Therefore, when the alarming means 60 stops sounding, all the relays and timers return to de-energized statuses, and the anti-theft system returns to the alert mode, thereby saving power.

Figure 5:
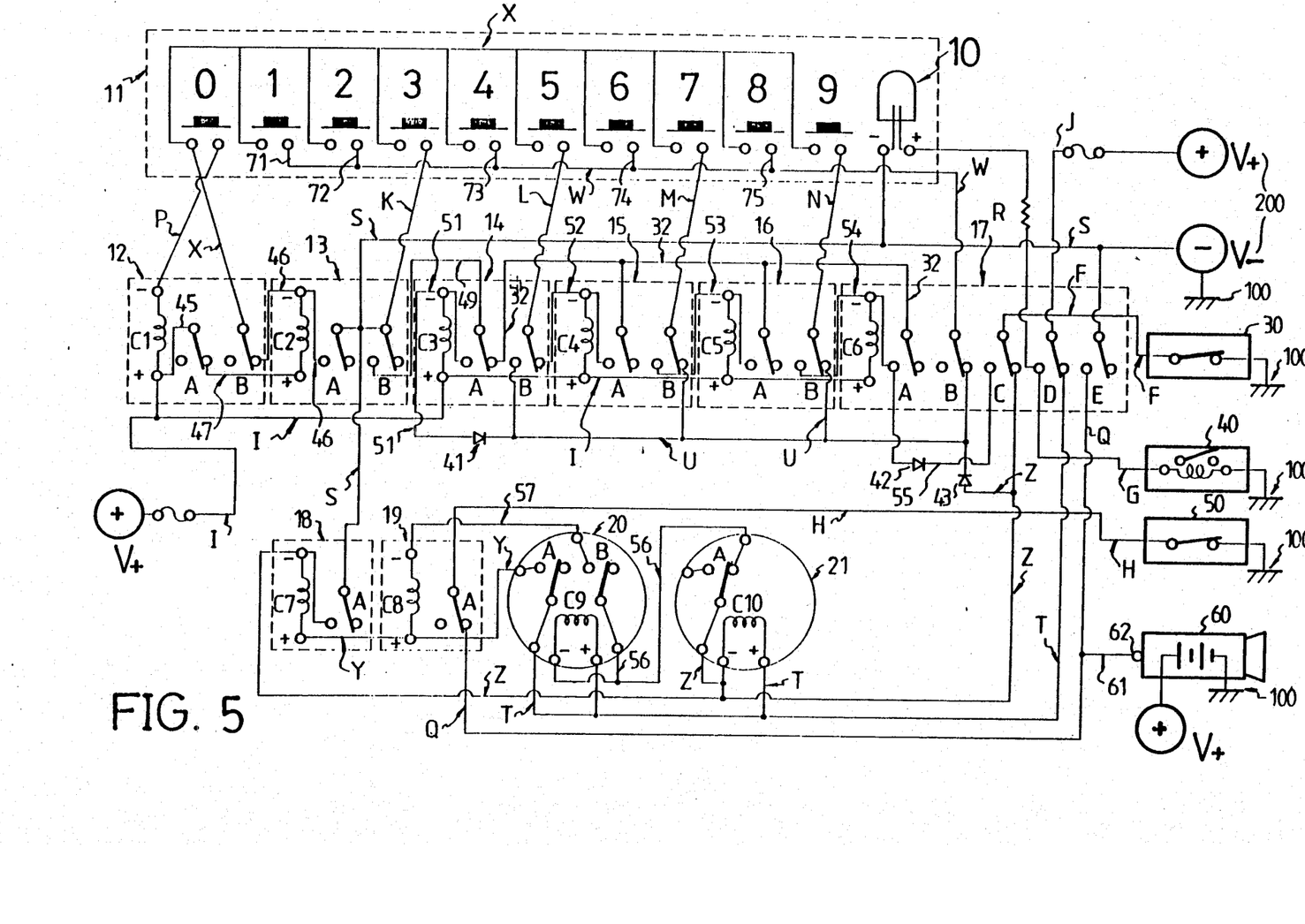
FIG. 5 is a view similar to FIG. 1, showing the system in a door-opened mode.

In another case, if the door is left open (herein called door-opened mode as shown in FIG. 5), the first sensing means 30 is closed (on) which enables line Z to be grounded, and further maintains the timers 20 and 21 in energized statuses. However, the holding relay 18 and the alarming relay 19 are both in de-energized statuses and the alarming means is silent. In this case, the system consumes little power, but a thief is still unable to start the vehicle (unless he knows the exact decoding number, "3579".

After either one of the above two cases (i.e., the door was opened, causing the alarming means 60 to sound once, then was closed again to alert mode or left open to door-opened mode), if the thief lifts up the engine hood of a vehicle or the vehicle is towed, the normally-closed switch 50 is actuated to be open and cut off the coupling of lines 61 and Q, and H to ground 100, which causes the alarming means 60 to sound. When the alarming means 60 sounds in this situation, even if the thief cuts off the lines 61 and Q or the charging loop (not labeled) for the chargeable battery therein, the sounding of the alarm is still maintained because the chargeable battery inside the alarming means 60 provides electricity for the alarming means 60 to sound. The alarming means 60 does not stop until the second sensing means 50 is recovered back to a normally-closed status, causing the control terminal 62 to be coupled to ground 100. This is the second alarming effect provided by the present invention.

Referring to FIGS. 1 and 5, the system is in the alert mode or the door-opened mode and the code is set as "03579," where the first digit "0" represents an "off" key which is used to release a key-locked mode, which will be described in detail later, and the second to fifth digits "3579" represent decoding keys, such as the first decoding key, the second decoding key, the third decoding key, and the fourth decoding key, respectively. The decoding keys "3579" are used to sequentially key in the code to disable the alert mode to a disabled mode. The second digit "3" is an "on" key which starts a required path to ground and holds it there for the remaining sequential decoding keys to obtain more grounded paths, thereby releasing/decoding the whole system from the alert mode to the disabled mode. In the alert mode or door-opened mode, if the "on" key is not keyed in first but keyed in with other keys, then no coupled relation will be changed, that is, the system is maintained in the original alert mode or door-opened mode, respectively.

The "off" key (herein set as "0") is not required to be keyed in when a user tries to decode the anti-theft system. However, the "off" key has two functions:

(1) to enable the system to an alert mode and achieve the anti-theft purpose; and (2) to release a key-locked mode to an alert mode.

The details of these will be described later.

When a user or a thief keys in a wrong key to decode the system, the system is enhanced to a key-locked mode, where the resetting relay 14 is energized and maintains the energized status, which in turn, disconnects the grounded path to the coding relays 15, 16 and the driving relay 17, eliminating the keys already keyed in and disabling the decoding procedure. In the mean time, the delaying timer 21 is triggered to count for a first predetermined period of time (30 seconds). In the key-locked mode, all the keys are disabled (locked) except the "off" key 0. Therefore, the user has to key in the "off" key 0 to release the key-locked mode and then key in the correct decoding keys "3579" within 30 seconds, otherwise the alarming means 60 will sound.

Since the "off" key 0 has such an important function, it is included in the code keys "03579."

When key 3 is pressed, the ground 100 is coupled to the negative terminal of the power-on relay 13 via lines S, K, keyswitch 3, line X, the fixed contact and the normally-closed contact of the B-set switch of the power-off relay 12, and line 46, thereby energizing the power-on relay 13, causing the A-set switch and the B-set switch thereof to switch from the normally-closed contacts to the normally-open contacts, respectively, introducing the ground 100 from line S to the negative terminal of the power-on relay 13, which is then maintained in the energized status and maintains line X to be grounded. Also, the ground 100 is coupled through line S to line 49, which in turn couples to line 32 via the A-set switch of the resetting relay 14 and maintains line 32 to be grounded, which constitutes part of a working loop in decoding. Therefore, key 3 is the "on" key.

When key 0 is pressed, the ground 100 is coupled to the negative terminal of the power-off relay 12 via line X, keyswitch 0, and line P, thereby energizing the power-off relay 12, causing the A-set switch and the B-set switch thereof to switch from the normally-closed contacts to the normally-open contacts, respectively, which in turn correspondingly cut off the electrical power to the positive terminal and the negative terminal of the power-on relay 13 and de-energize the power-on relay 13, decoupling the ground 100 to lines X and 32 and cutting off the working loop when decoding. Therefore, key 0 is the "off" key.

Referring to FIG. 1, the code in this embodiment is set as "03579." As described previously, the decoding keys are the "3579" in sequence. Key 3 is the "on" key which is also the first decoding key. If a user does not press key 3 first, the remaining decoding keys are invalid.

Figure 4:
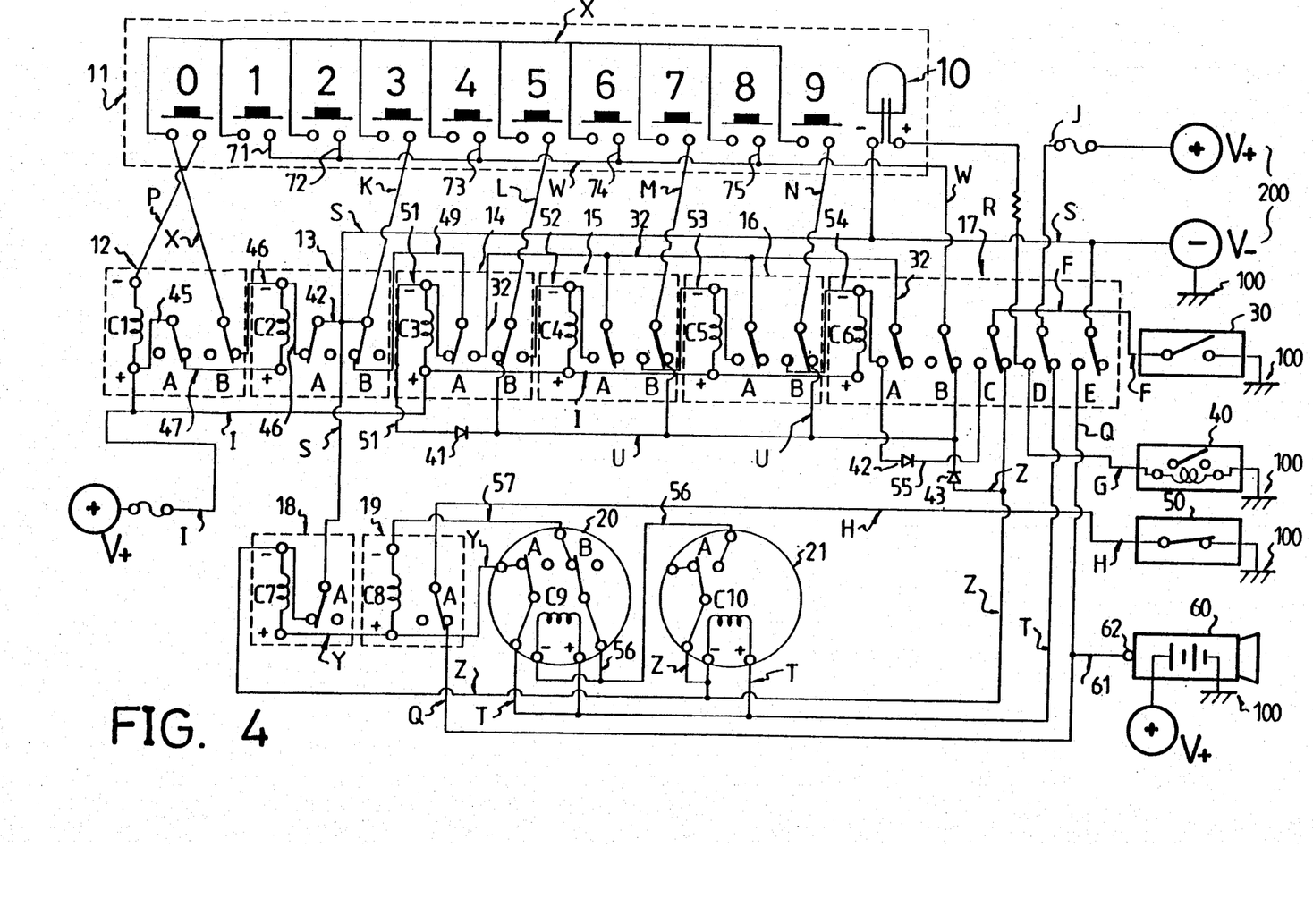
FIG. 4 is a view similar to FIG. 1, showing an incorrect key-in and resulting in the system being locked and further triggering a corresponding alarming path thereof.

If a thief presses keyswitch 3 first but then does not press key 5, but presses one of the keys 1, 2, 4, 6, 7, 8, or 9, the resetting relay 14 is energized which causes the A-set switch and the B-set switch thereof to switch from the normally-closed contacts to the normally-open contacts thereof, respectively, as shown in FIG. 4. In the mean time, the ground 100 is coupled to the negative terminal of the resetting relay 14, via line 49, maintaining the resetting relay 14 in energized status, which in turn decouples the ground 100 to line 32 and cuts off the required grounding path for the coding relays 15, 16 and the driving relay 17 to be energized. In this situation, the system is in a key-locked mode, all the keys being locked except the "off" key 0.

Also, the ground 100 is transparent to line Z via the key being pressed, line M, N, or W; the normally-closed contact of the B-set switch of the first coding relay 15 or the second coding relay 16; line U or the B-set switch of the driving relay 17; and the third diode 43, thereby actuating the delaying timer 21 to count.

The only way to release the key-locked mode is to press the "off" key 0 for de-energizing the resetting relay 14, letting the system return to the alert mode (if the door is already closed) or the door-opened mode (if the door is still open).

In order to operate the predetermined decoding procedure, the user or thief needs to know which key has been set as the "off" key (in this example, key 0); therefore, he can release the key-locked mode. Also, he has to key in the correct code "3579" in a predetermined period of time (30 seconds in this embodiment); otherwise, the alarming means 60 will be triggered to sound.

CORRECT DECODING PROCEDURE

Referring to FIG. 1, the code is "03579," and the decoding keys are "3579". The corresponding relays for decoding are relays 13, 14, 15, 16, and 17. For decoding, the following procedure must be followed.

First, press key 3, causing the power-on relay 13 to maintain in energized status which causes a grounded path constituted by line 32, the A-set switch of the resetting relay 14, line 49, the B-set switch of the power-on relay 13, and line S to provide a grounded path for the following decoding procedure.

Second, press key 5. The ground 100 is coupled to the negative terminal of the first coding relay 15 via line X, keyswitch 5, line L, the normally-closed contact of the B-set switch of the resetting relay 14, and line 52, thereby energizing the first coding relay 15, causing the A-set switch and the B-set switch thereof to switch from their normally-closed contacts to their normally-open contacts, respectively, thereby coupling line 32 to the negative terminal of the first coding relay 15 and maintaining the relay 15 in the energized status.

Third, press key 7. The ground 100 is coupled to the negative terminal of the second coding relay 16 via line X, keyswitch 7, line M, the normally-open contact of the B-set switch of the first coding relay 15, and line 53, thereby energizing the second coding relay 16, causing the A-set switch and the B-set switch thereof to switch from their normally-closed contacts to their normally-open contacts, respectively, thereby coupling line 32 to the negative terminal of the second coding relay 16 and maintaining the relay 16 in the energized status.

Fourth, press key 9. The ground 100 is coupled to the negative terminal of the driving relay 17 via line X, key-switch 9, line N, the normally-open contact of the B-set switch of the second coding relay 16, and line 54, thereby energizing the driving relay 17, causing the A to E-set switches thereof to switch from their normally-closed contacts to their normally-open contacts, respectively, thereby coupling line 32 to the negative terminal of the driving relay 17 and maintaining the relay 17 in the energized status.

After the above decoding procedure, the relays 15, 16, and 17 are all maintained in the energized status and the anti-theft system is in the disabled mode, as shown in FIG. 3.

Referring to FIG. 3, because all the B-set switches of the relays 15, 16, and 17 are switched to their normally-open contacts, the possible grounded paths to the negative terminal of the resetting relay 14 and line Z are disconnected, thereby preventing the system to change from the disabled mode to the key-locked mode.

In the disabled mode (FIG. 3), the C-set switch, the D-set switch, and the E-set switch of the driving relay 17 are switched to their normally-open contacts, respectively, cutting off the grounded path of line Z and the power supplying path of line T, thereby disabling the timers 20, 21 and the relays 18, 19. Also, line Q is grounded via the normally-open contact of the E-set switch of the driving relay 17 and line S, thereby providing a grounded path to the control terminal 62 of the alarming means 60 and preventing the alarming means 60 to sound.

In the disabled mode (FIG. 3), the starting means 40 is energized by the power source 200 via a power supplying path constituted by line G, the D-set switch of the driving relay 17, and line J, thereby starting the vehicle.

In the disabled mode (FIG. 3), the indicator means 10 is energized by the power source 200 via a power-supplying path constituted by line J, the D-set switch of the driving relay 17, and resistor R, thereby indicating to the user that the anti-theft system is in the disabled mode and the vehicle is ready to be operated.

PRACTICAL OPERATION OF THE SYSTEM

When the user drives the vehicle to a destination and wants to leave the vehicle, he has to enable the anti-theft system.

To enable the anti-theft system, the user has to open the door first, press the "off" key, exit the vehicle, and close the door.

The "off" key should not be pressed first and then the door opened, because after the user presses the "off" key (the door is still closed now), the anti-theft system enters the alert mode; therefore, when the user opens the door to leave, the delaying timer 21 will be triggered to count for 30 seconds, causing the alarming means 60 to sound for 10 seconds.

Referring to FIG. 3, first, when the user opens the door, the first sensing means 30 is closed, thereby coupling the ground 100 to the normally-open contact of the A-set switch of the driving relay 17 via line F, the normally-open contact of the C-set switch of the driving relay 17, line 55, and the second diode 42, and further providing new grounded paths therefrom to relay 17 via line 54, to relay 16 via lines 32 and 53, and to relay 15 via lines 32 and 52.

Second, the user presses the "off" key 0, de-energizing the power-on relay 13. However, the relays 15, 16, and 17 are maintained in the energized status because of the new grounded paths set in the first procedure.

Third, the user closes the door, decoupling the ground 100 to relays 15, 16, and 17, thereby enabling the vehicle to alert mode as shown in FIG. 1.

CHANGING THE CODE

Referring to FIG. 1, the jumping wires P, K, L, M, N, 71, 72, 73, 74, and 75 are connected to a second contact of a corresponding keyswitch. Actually, the code of the system is determined by the corresponding keys connected to the jumping wires P, K, L, M, and N sequentially. Therefore, in FIG. 1, the code is set as "03579" because keys 0, 3, 5, 7, and 9 are connected to jumping wires P, K, K, M, and N, respectively.

Figure 2:
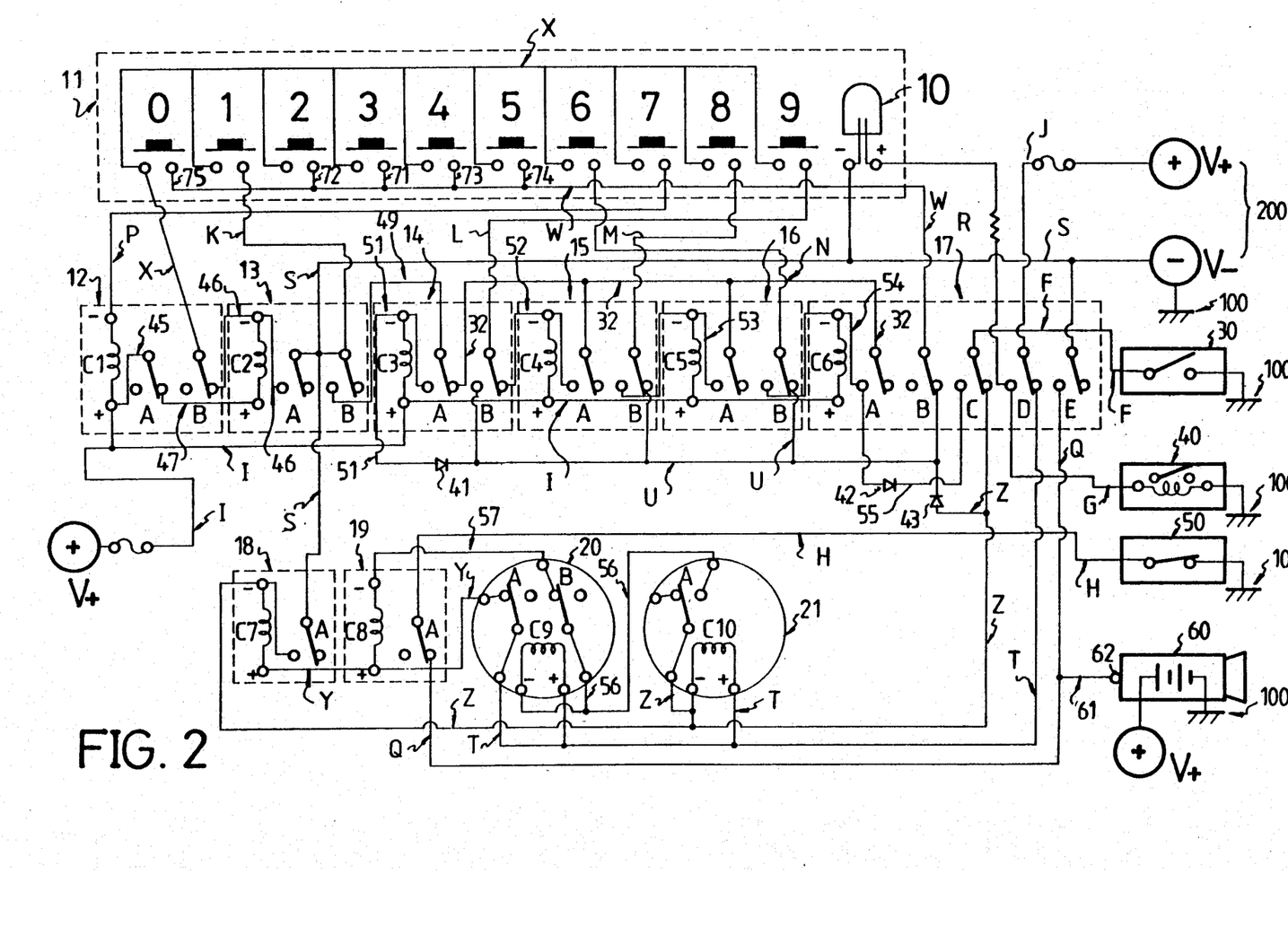
FIG. 2 is a view similar to FIG. 1, showing the code set as "71986"

If the user wants to change the code from "03579" (as shown in FIG. 1) to "71986" (as shown in FIG. 2), he merely needs to exchange (switch over) five pairs of lines: P and M, K and 71, L and N, M and 75, and N and 74.

Actually, each of the jumping wires P, K, L, M, N, 71, 72, 73, 74, and 75 has a different color, for recognition and easy change of codes. However, the possible mapping relations between the colors and the jumping wires are numerous. Therefore, the user has to check a mapping table first to distinguish each jumping wire.

Furthermore, the number of coding digits can be increased by increasing the number of coding relays 15 and 16 as in the above embodiment, and the connection thereof is the same between relays 15 and 16.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A coded anti-theft system for a vehicle comprising:
   a keyswitch board having a plurality of normally-open keyswitches each having a first contact, a second contact, and a conductive bar and each corresponding to a number;
   a power supply having a positive terminal and a negative terminal to supply direct current power, said negative terminal being coupled to ground;
   alarming means having a chargeable battery which is charged by said power supply and grounded at a control terminal thereof, such that when said control terminal is removed from ground, said alarming means sounds;
   first sensing means comprising a normally-open switch which is installed on a door portion of the vehicle for sensing a door status, such that when the door is closed, said door switch is open, and when the door is open, said door switch is short, triggering said alarming means to sound;
   second sensing means comprising a normally-closed switch which is installed on an engine hood portion of the vehicle for sensing an engine-hood status, such that when the hood is lifted up more than a predetermined distance, said normally-closed switch opens, triggering said alarming means to sound;
   indicator means for indicating a status of said system, such that when said indicator means is off, said system is in an alert mode or key-locked mode, and when said indicator means is on, said system is in a disabled mode;

starting means for enabling the vehicle to start when said system is in a disabled mode;

a power-off relay communicating with said keyswitch board for cutting off required loops of decoding;

a power-on relay communicating with said keyswitch board and said power-off relay for forming a required path of decoding;

a resetting relay for key-locking communicating with said keyswitch board and said power-on relay;

a first coding relay for decoding communicating with said keyswitch board and said resetting relay;

a second coding relay for decoding communicating with said keyswitch board and said first coding relay;

a holding relay communicating with said power-on relay for holding a temporary grounded path due to a door opening and to error decoding;

an alarming relay communcating with said alarming means, said holding relay, and said second sensing means for controlling said alarming means;

a limiting timer communicating with said alarming relay for determining a time period for alarming;

a delaying timer communicating with said limiting timer for determining a time period from opening of a door until said alarming means sounds; and a driving relay for controlling an energized status of said system communicating with said keyswitch board, said power-on relay, said resetting relay, said first coding relay, said second coding relay, said holding relay, said alarming relay, said limiting timer, said delaying timer, said first sensing means, said indicator means, and said starting means.

2. A system as claim in claim 1, wherein each said relay and each said timer comprises a relay coil and at least one set of switches which comprises a fixed relay contact, a normally-closed contact, and a normally-open contact, each said relay coil having a positive terminal and a negative terminal.

3. A system as claim in claim 2, wherein:

said power-off relay comprises a first coil, an A-set switch, and a B-set switch;

said power-on relay comprises a second coil, an A-set switch, and a B-set switch;

said resetting relay comprises a third coil, an A-set switch, and a B-set switch;

said first coding relay comprises a fourth coil, an A-set switch, and a B-set switch;

said second coding relay comprises a fifth coil, an A-set switch, and a B-set switch;

said driving relay comprises a sixth coil, an A-set switch, a B-set switch, a C-set switch, a D-set switch, and an E-set switch;

said holding relay comprises a seventh coil and an A-set switch;

said alarming relay comprises an eighth coil and an A-set switch;

said limiting timer comprises a ninth coil, an A-set switch, and a B-set switch;

said delaying timer comprises a tenth coil and an A-set switch;

said negative terminal of said power supply, said normally-closed contact of said E-set switch of said driving relay, a negative terminal of said indicator means, and said fixed contact of said holding relay are coupled to ground;

said A-set to said E-set switch having a normally-closed contact, a normally-open contact, and a fixed contact;

said negative terminal of said power-on relay being coupled to said normally-open contact of said A-set switch thereof and to said normally-closed contact of said B-set switch of said power-off relay;

said normally-open contact of said B-set switch of said power-on relay being coupled to said fixed contact of said A-set switch of said resetting relay;

said normally-closed contact of said A-set switch of said resetting relay, said fixed contact of said A-set switch of said first coding relay, said fixed contact of said A-set switch of said second coding relay, and said fixed contact of said driving relay being coupled together;

said negative terminal of said resetting relay being coupled to said normally-open contact of said A-set switch thereof and to a first diode;

said first diode being coupled to said negative terminal of said resetting relay at an anode thereof for limiting ground coupling in a single direction;

a cathode of said first diode, said normally-open contact of said B-set switch of said resetting relay, said normally-closed contacts of said B-set switches of said first and said second coding relays, said normally-closed contact of said B-set switch of said driving relay, and a third diode being coupled together;

said third diode being coupled to said cathode of said first diode at a cathode thereof and further coupled to said normally-closed contact of said C-set switch of said driving relay at an anode thereof for limiting ground coupling in a single direction;

said negative terminal of said first coding relay being coupled to said normally-open contact of said A-set switch thereof and to said normally-closed contact of said B-set switch of said resetting relay;

said negative terminal of said second coding relay being coupled to said normally-open contact of said A-set switch thereof and to said normally-open contact of said B-set switch of said first coding relay;

said negative terminal of said driving relay being coupled to said normally-open contact of said A-set switch thereof, to said normally-open contact of said B-set switch of said second coding relay, and to a second diode;

a cathode of said second diode being coupled to said normally-open contact of said C-set switch of said driving relay for limiting ground coupling in a single direction;

said positive terminal of said power supply being coupled to said positive terminals of said power-off relay, said resetting relay, said first and second coding relays, and said driving relay;

said positive terminal of said power-off relay being coupled to said fixed contact of said A-set switch thereof;

said positive terminal of said power supply being also coupled to said fixed relay contact of said D-set switch of said driving relay;

said positive terminal of said power-on relay being coupled to said normally-closed contact of said A-set switch of said power-off relay;

said normally-closed contact of said D-set switch of said driving relay being coupled to said positive terminals of said delaying timer and said limiting timer and said fixed contact of said A-set switch of said limiting timer;

said normally-closed contact of said A-set switch of said limiting timer being coupled to said positive terminals of said holding relay and said alarming relay;

said switch of said first sensing means having one end thereof coupled to ground and the other end thereof coupled to said fixed contact of said C-set switch of said driving relay;

said normally-closed contact of said C-set switch of said driving relay, said anode of said third diode, said negative terminal of said delaying timer, said fixed contact of said A-set switch of said delaying timer, said negative terminal of said holding relay, and said normally-open contact of said A-set switch thereof being coupled together;

said normally-open contact of said A-set switch of said delaying timer being coupled to said fixed contact said B-set switch of said limiting timer and said negative terminal thereof;

said normally-closed contact of said B-set switch of said limiting timer being coupled to said negative terminal of said alarming relay;

said starting means being coupled to ground and to said normally-open contact of said D-set switch of said driving relay, whereby when said driving relay is energized, said D-set switch thereof couples to a loop to actuate said starting means, such that a motor of the vehicle is able to be started;

said indicator means being coupled to said normally-open contact of said D-set switch of said driving relay and to ground;

said switch of said second sensing means being coupled to ground and to said fixed relay contact of said alarming relay;

said normally-closed contact of said A-set switch of said alarming relay being coupled to said control terminal of said alarming means;

said control terminal of said alarming means being coupled to said normally-open contact of said E-set switch of said driving relay;

said keyswitches having said first contacts thereof being coupled together to said fixed contact of said B-set switch of said power-off relay;

said negative terminal of said power-off relay being coupled to a corresponding second contact of one of said keyswitches, thereby defining said keyswitch to be an "off" key;

said fixed contact of said B-set switch of said power-on relay being coupled to a corresponding second contact of a keyswitch other than that of said "off" key, thereby defining said keyswitch to be a first decoding key;

said fixed contact of said B-set switch of said resetting relay being coupled to a corresponding second contact of a keyswitch other than those of said "off" key and said first decoding key, thereby defining said keyswitch to be a second decoding key;

said fixed contact of said B-set switch of said first coding relay being coupled to a corresponding second contact of a keyswitch other than those of said "off" key, said first decoding key, and said second decoding key, thereby defining said keyswitch to be a third decoding key;

said fixed contact of said B-set switch of said second coding relay being coupled to a corresponding second contact of a keyswitch other than those of said "off" key, said first decoding key, said second decoding key, and said third decoding key, thereby decoding said keyswitch to be a fourth decoding key.

4. A system as claimed in claim 3, wherein sequential numbers corresponding to said "off" key, said first decoding key, said second decoding key, said third decoding key, and said fourth decoding key, respectively define a code of said anti-theft system.

5. A system as claimed in claim 4, wherein said code is changeable.

6. A system as claimed in claim 3, wherein said positive terminals of said holding relay, said alarming relay, said limiting timer, and said delaying time are coupled to said positive terminal of said power supply;

said negative terminals of said holding relay, said alarming relay, said limiting timer, and said delaying timer are grounded, such that when said switch of said first sensing means is on, said alarming system is energized and sound a first alarm;

said negative terminals of said holding relay, said alarming relay, said limiting timer, and said delaying timer are grounded, thereby causing said alarming means to sound.

7. A system as claimed in claim 3, wherein said switch of said second sensing means has one end thereof coupled to ground and the other end thereof coupled to said control terminal of said alarming means to constitute a normally-closed alarming loop, such that when said loop is opened, said alarming means is triggered to provide a second alarm.

8. A system as claimed in claim 6, wherein said fixed contact of said A-set switch of said holding relay is grounded and said normally-open contact thereof is coupled to said negative terminals of said holding relay and said delaying timer, such that when said switch of said first sensing means is on, said holding relay is in an energized status, enabling said delaying relay to count for a period of time and trigger said alarming means to sound.

9. A system as claimed in claim 3, wherein said fixed contact of said A-set switch of said holding relay is grounded and said normally-open contact thereof is coupled to said negative terminals of said holding relay and said delaying timer, such that when an incorrect decoding key is keyed in, said third diode is grounded at said cathode thereof which triggers said holding relay to be in an energized status, enabling said delaying relay to count for a period of time and trigger said alarming means to sound.

10. A system as claimed in claim 3, wherein said keyswitches other than those of said "off" key, said first to fourth decoding keys, are coupled to said negative terminal of said resetting relay, such that when a corresponding key is incorrectly keyed in, said resetting relay is energized, thereby locking all keys except said "off" key.

11. A system as claimed in claim 3, wherein said third decoding key and said fourth decoding key are respectively coupled to said normally-closed contacts of said B-set switches of said first coding relay and said second coding relay, such that when either of said third decoding key or said fourth decoding key is incorrectly keyed in, said resetting relay is energized, locking all keys except said "off" key.

* * * * *